United States Patent
Helfman

(10) Patent No.: US 10,684,748 B2
(45) Date of Patent: *Jun. 16, 2020

(54) USER INTERFACE CONTROLS FOR SPECIFYING DATA HIERARCHIES

(71) Applicant: Oracle International Corporation, Redwood Shores, CA (US)

(72) Inventor: Jonathan Helfman, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,329

(22) Filed: Apr. 3, 2019

(65) Prior Publication Data

US 2019/0227680 A1   Jul. 25, 2019

Related U.S. Application Data

(63) Continuation of application No. 15/187,615, filed on Jun. 20, 2016, now Pat. No. 10,296,172, which is a (Continued)

(51) Int. Cl.
   *G06F 3/048* (2013.01)
   *G06F 16/26* (2019.01)
   (Continued)

(52) U.S. Cl.
   CPC ........ *G06F 3/0482* (2013.01); *G06F 3/04842* (2013.01); *G06F 3/04847* (2013.01);
   (Continued)

(58) Field of Classification Search
   CPC .... G06F 3/0482; G06F 16/26; G06F 3/04842; G06F 3/04847; G06T 11/206; G06T 2200/24
   See application file for complete search history.

(56) References Cited

U.S. PATENT DOCUMENTS

| | | | |
|---|---|---|---|
| 5,555,354 A | 9/1996 | Strasnick et al. | |
| 6,104,398 A * | 8/2000 | Cox, Jr. | G06F 3/04847 715/821 |

(Continued)

FOREIGN PATENT DOCUMENTS

JP   2005011043   1/2005

OTHER PUBLICATIONS

Wayback machine internet archive date of prior art capture, May 6, 2004, http://www.cs.umd.edu/hcil/treemap/doc4.1/toc.html, 5 pages.

(Continued)

*Primary Examiner* — Ryan Barrett
*Assistant Examiner* — Haimei Jiang
(74) *Attorney, Agent, or Firm* — Kilpatrick Townsend & Stockton LLP

(57) ABSTRACT

User interface controls that facilitate the specification/modification of data hierarchies. In one set of embodiments, a first UI control component can be provided that comprises an ordered group of drop-down menus. Each drop-down menu in the ordered group can be populated with a selectable list of attributes from a data set and can be associated with a level in a data hierarchy. By selecting values using the various drop-down menus, a user can interactively specify a data hierarchy for the data set. The data set can then be visualized according to the specified hierarchy. In further embodiments, a second UI control component can be provided in addition to the first UI control component. The second UI control component can allow a user to interactively enable or disable certain drop-down menus in the ordered group, thereby acting as a "depth filter" for controlling the depth of the data hierarchy.

20 Claims, 11 Drawing Sheets

Related U.S. Application Data continuation of application No. 12/503,404, filed on Jul. 15, 2009, now Pat. No. 9,396,241.

(51) Int. Cl.
  *G06T 11/20* (2006.01)
  *G06F 3/0482* (2013.01)
  *G06F 3/0484* (2013.01)

(52) U.S. Cl.
  CPC ............ *G06F 16/26* (2019.01); *G06T 11/206* (2013.01); *G06T 2200/24* (2013.01)

(56) References Cited

U.S. PATENT DOCUMENTS

| | | | |
|---|---|---|---|
| 6,108,006 A | 8/2000 | Hoppe | |
| 6,285,366 B1 | 9/2001 | Ng et al. | |
| 6,349,315 B1 | 2/2002 | Sonoyama et al. | |
| 6,429,868 B1 | 8/2002 | Dehner, Jr. et al. | |
| 6,496,832 B2 | 12/2002 | Chi et al. | |
| 6,581,068 B1 | 6/2003 | Bensoussan et al. | |
| 6,583,794 B1 | 6/2003 | Wattenberg | |
| 6,628,312 B1 | 9/2003 | Rao et al. | |
| 6,646,652 B2 | 11/2003 | Card et al. | |
| 6,724,403 B1 | 4/2004 | Santoro et al. | |
| 6,812,941 B1 | 11/2004 | Brown et al. | |
| 6,928,436 B2 | 8/2005 | Baudel | |
| 6,941,513 B2 | 9/2005 | Meystel et al. | |
| 6,963,339 B2 | 11/2005 | Leah et al. | |
| 7,027,052 B1 | 4/2006 | Thorn et al. | |
| 7,076,742 B1 | 7/2006 | Thorn et al. | |
| 7,250,944 B2 | 7/2007 | Anderson et al. | |
| 7,287,234 B2 | 10/2007 | Leah et al. | |
| 7,336,279 B1 | 2/2008 | Takiguchi | |
| 7,346,858 B1 | 3/2008 | Berg et al. | |
| 7,378,969 B2 | 5/2008 | Chan et al. | |
| 7,427,987 B2 | 9/2008 | Uthe | |
| 7,429,987 B2 | 9/2008 | Leah et al. | |
| 7,447,999 B1 | 11/2008 | Robertson et al. | |
| 7,506,274 B2 | 3/2009 | Zhang et al. | |
| 7,509,591 B1 | 3/2009 | Thorn et al. | |
| 7,526,494 B2 | 4/2009 | Rom et al. | |
| 7,605,813 B2 | 10/2009 | Uthe | |
| 7,650,570 B2 | 1/2010 | Torrens et al. | |
| 7,689,570 B2 | 3/2010 | Fuchs | |
| 7,707,517 B2 | 4/2010 | Bier et al. | |
| 7,756,907 B2 | 7/2010 | Hanrahan et al. | |
| 7,774,167 B2 | 8/2010 | Bregulla et al. | |
| 7,827,565 B2 * | 11/2010 | Minium, Jr. | G06F 9/541 717/101 |
| 7,921,363 B1 | 4/2011 | Hao et al. | |
| 8,139,063 B2 | 3/2012 | Helfman et al. | |
| 8,161,410 B2 | 4/2012 | Bray | |
| 8,281,282 B2 | 10/2012 | Smith | |
| 8,286,100 B2 | 10/2012 | Helfman et al. | |
| 8,640,056 B2 | 1/2014 | Helfman et al. | |
| 8,866,815 B2 | 10/2014 | Helfman et al. | |
| 8,868,620 B2 | 10/2014 | Singh | |
| 8,910,084 B2 | 12/2014 | Helfman et al. | |
| 9,396,241 B2 | 7/2016 | Helfman | |
| 2001/0007139 A1 | 7/2001 | Murray | |
| 2002/0046009 A1 | 4/2002 | Devaquet et al. | |
| 2002/0143864 A1 | 10/2002 | Page et al. | |
| 2002/0169730 A1 | 11/2002 | Lazaridis | |
| 2002/0169793 A1 | 11/2002 | Sweeney | |
| 2003/0030634 A1 | 2/2003 | Sang'udi et al. | |
| 2003/0052838 A1 | 3/2003 | Kim et al. | |
| 2003/0158846 A1 | 8/2003 | Ikehata et al. | |
| 2003/0182177 A1 | 9/2003 | Gallagher et al. | |
| 2003/0214538 A1 | 11/2003 | Farrington et al. | |
| 2003/0237057 A1 | 12/2003 | Riedl et al. | |
| 2004/0046787 A1 * | 3/2004 | Henry | G06F 8/38 715/744 |
| 2004/0076139 A1 | 4/2004 | Kang-yeh et al. | |
| 2004/0107277 A1 | 6/2004 | Levesque et al. | |
| 2004/0168115 A1 | 8/2004 | Bauernschmidt et al. | |
| 2004/0181554 A1 | 9/2004 | Heckerman et al. | |
| 2004/0183800 A1 | 9/2004 | Peterson | |
| 2004/0205535 A1 | 10/2004 | Newman et al. | |
| 2004/0205536 A1 | 10/2004 | Newman et al. | |
| 2004/0212615 A1 | 10/2004 | Uthe | |
| 2004/0225962 A1 | 11/2004 | Ohashi et al. | |
| 2004/0236549 A1 | 11/2004 | Dalton | |
| 2004/0243593 A1 | 12/2004 | Stolte et al. | |
| 2004/0263513 A1 | 12/2004 | Smith et al. | |
| 2004/0264513 A1 | 12/2004 | Shima et al. | |
| 2005/0114786 A1 | 5/2005 | Decombe | |
| 2005/0149269 A1 | 7/2005 | Thomas et al. | |
| 2005/0160004 A1 * | 7/2005 | Moss | G06Q 30/00 705/14.35 |
| 2005/0192930 A1 | 9/2005 | Hightower et al. | |
| 2006/0037019 A1 | 2/2006 | Austin et al. | |
| 2006/0044307 A1 | 3/2006 | Song | |
| 2006/0082592 A1 | 4/2006 | Black-Ziegelbein et al. | |
| 2006/0109949 A1 | 5/2006 | Tkaczyk et al. | |
| 2006/0218533 A1 * | 9/2006 | Koduru | G06F 11/3447 717/124 |
| 2006/0235838 A1 | 10/2006 | Shan et al. | |
| 2006/0242063 A1 * | 10/2006 | Peterson | G06Q 20/04 705/42 |
| 2006/0242169 A1 | 10/2006 | Tunning | |
| 2006/0248468 A1 | 11/2006 | Constantine et al. | |
| 2007/0011146 A1 | 1/2007 | Holbrook | |
| 2007/0090951 A1 | 4/2007 | Chan et al. | |
| 2007/0203902 A1 | 8/2007 | Bauerle et al. | |
| 2007/0217689 A1 | 9/2007 | Yang et al. | |
| 2007/0226640 A1 | 9/2007 | Holbrook et al. | |
| 2007/0276228 A1 | 11/2007 | Vining et al. | |
| 2008/0010304 A1 | 1/2008 | Vempala et al. | |
| 2008/0027980 A1 | 1/2008 | Owens et al. | |
| 2008/0027981 A1 | 1/2008 | Wahl | |
| 2008/0046462 A1 | 2/2008 | Kaufman et al. | |
| 2008/0059911 A1 | 3/2008 | Kulo et al. | |
| 2008/0088628 A1 | 4/2008 | Lu et al. | |
| 2008/0216169 A1 | 9/2008 | Naizhen et al. | |
| 2008/0222129 A1 | 9/2008 | Komatsu et al. | |
| 2008/0231633 A1 | 9/2008 | Keller et al. | |
| 2008/0278496 A1 | 11/2008 | Helfman et al. | |
| 2008/0295038 A1 * | 11/2008 | Helfman | G06T 11/206 715/853 |
| 2009/0012991 A1 * | 1/2009 | Johnson | G06Q 30/0623 |
| 2009/0013270 A1 * | 1/2009 | Helfman | G06F 3/0481 715/764 |
| 2009/0013271 A1 * | 1/2009 | Helfman | G06F 16/26 715/764 |
| 2009/0013281 A1 * | 1/2009 | Helfman | G06Q 10/10 715/788 |
| 2009/0013287 A1 * | 1/2009 | Helfman | G06T 11/206 715/853 |
| 2009/0172603 A1 | 7/2009 | Young Suk Lee | |
| 2010/0214120 A1 * | 8/2010 | Means | E21B 49/008 340/853.3 |
| 2010/0280877 A1 * | 11/2010 | Shelton | G06Q 30/02 705/7.29 |
| 2010/0287146 A1 * | 11/2010 | Skelton | G06Q 10/06 707/705 |
| 2011/0016432 A1 | 1/2011 | Helfman | |
| 2014/0101591 A1 | 4/2014 | Helfman et al. | |
| 2015/0012552 A1 | 1/2015 | Helfman et al. | |
| 2016/0291819 A1 | 10/2016 | Helfman | |

OTHER PUBLICATIONS

"Honeycomb: The Application for Turning Enterprise Data into Actionable Information", The Hive Group downloaded from the Internet: <<http://hivegroup.com/products.html>>, © 2000-2007, 3 pages.

"IE Boxing", Internet Archive: Wayback Machine. Feb. 6, 2006. available online at <<http://web.archive.org/web20060206032530/ http://webhost.bridgew.edu/etribou/layouts/exp/ieboxes.html>, May, 20 2010, 2 pages.

(56) References Cited

OTHER PUBLICATIONS

"Manufacturing Quality Management", The Hive Group, available online at <<www.hivegroup.com/demos/productmgmnt/product failure_ readlink.html>>, © 2000-2007, 2 pages.
"Map of the Market", Smartmoney.com, available online at <http://www.smartmoney.com/marketmap/popupfresh.cfm>>, May 18, 2007, 2 pages.
"Treemap 4.1.1", University of Maryland, Feb. 7, 2004, pp. 1-7.
U.S. Appl. No. 11/745,280, "Final Office Action", dated Nov. 10, 2010, 13 pages.
U.S. Appl. No. 11/745,280, "Non-Final Office Action", dated May 24, 2010, 12 pages.
U.S. Appl. No. 11/745,280, "Notice of Allowance", dated Nov. 17, 2011, 8 pages.
U.S. Appl. No. 11/752,915, "Final Office Action", dated Nov. 24, 2010, 13 pages.
U.S. Appl. No. 11/752,915, "Final Office Action", dated Sep. 6, 2012, 18 pages.
U.S. Appl. No. 11/752,915, "Non Final Office Action", dated Jun. 12, 2013, 15 pages.
U.S. Appl. No. 11/752,915, "Non-Final Office Action", dated Jun. 10, 2010, 11 pages.
U.S. Appl. No. 11/752,915, "Non-Final Office Action", dated Feb. 13, 2012, 18 pages.
U.S. Appl. No. 11/752,915, "Notice of Allowance", dated Jun. 20, 2014, 7 pages.
U.S. Appl. No. 11/773,880, "Final Office Action", dated Mar. 10, 2011, 10 pages.
U.S. Appl. No. 11/773,880, "Non-Final Office Action", dated Mar. 26, 2013, 10 pages.
U.S. Appl. No. 11/773,880, "Non-Final Office Action", dated Sep. 17, 2010, 8 pages.
U.S. Appl. No. 11/773,880, "Notice of Allowance", dated Aug. 8, 2014, 8 pages.
U.S. Appl. No. 11/773,895, "Final Office Action", dated Mar. 16, 2011, 11 pages.
U.S. Appl. No. 11/773,895, "Non-Final Office Action", dated Sep. 17, 2010, 10 pages.
U.S. Appl. No. 11/773,895, "Non-Final Office Action", dated Mar. 28, 2013, 12 pages.
U.S. Appl. No. 11/773,895, "Non-Final Office Action", dated Jan. 5, 2012, 9 pages.
U.S. Appl. No. 11/773,895, "Notice of Allowance", dated Sep. 27, 2013, 11 pages.
U.S. Appl. No. 11/773,908, "Final Office Action", dated Mar. 16, 2011, 9 pages.
U.S. Appl. No. 11/773,908, "Non-Final Office Action", dated Sep. 17, 2010, 8 pages.
U.S. Appl. No. 11/773,908, "Notice of Allowance", dated Feb. 10, 2012, 12 pages.
U.S. Appl. No. 11/773,908, "Notice of Allowance", dated Jun. 11, 2012, 8 pages.
U.S. Appl. No. 11/773,916, "Final Office Action", dated Jun. 30, 2015, 10 pages.
U.S. Appl. No. 11/773,916, "Final Office Action", dated Nov. 23, 2010, 10 pages.
U.S. Appl. No. 11/773,91, "Non-Final Office Action", dated Oct. 23, 2014, 10 pages.
U.S. Appl. No. 11/773,916, "Non-Final Office Action", dated Dec. 22, 2011, 9 pages.
U.S. Appl. No. 11/773,916, "Non-Final Office Action", dated Jun. 8, 2010, 9 pages.
U.S. Appl. No. 11/773,916, "Notice of Allowance", dated Jun. 21, 2016, 5 pages.
U.S. Appl. No. 12/503,404, "Final Office Action", dated Jul. 19, 2013, 21 pages.
U.S. Appl. No. 12/503,404, "Final Office Action", dated Mar. 29, 2013, 21 pages.
U.S. Appl. No. 12/503,404, "Non-Final Office Action", dated Aug. 31, 2012, 19 pages.
U.S. Appl. No. 12/503,404, "Notice of Allowance", dated May 5, 2016, 11 pages.
U.S. Appl. No. 14/103,692, "Notice of Allowance", dated May 25, 2016, 7 pages.
U.S. Appl. No. 14/491,722, "Final Office Action", dated Oct. 26, 2016, 19 pages.
U.S. Appl. No. 15/187,615, "Notice of Allowance", dated Feb. 13, 2019, 9 pages.
Andrienko et al., "Interactive maps for visual data exploration", available online at http://geoanalytics.net/and/papers/ijgis99.pdf, International Journal of Geographical Information Science, vol. 13, No. 4, 1999, pp. 355-374.
Kolatch et al., "CatTrees: Dynamic Visualization of Categorical Data Using Treemaps", available online at http://www.cs.umd.edu/class/spring2001/cmsc838b/Project/Kolatch_Wei nstein/index.html, May 2001, pp. 1-12.
Shneiderman, "Tree Visualization with Tree-Maps: 2-d Space-Filling Approach", ACM Transactions on Graphics, avaiable online at <<http://hcil.cs.umd.edu/trs/91-03/91-03.html>> vol. 11, No. 1, Jan. 1992, pp. 92-99.
Shneiderman, "Treemaps for space-constrained visualization of hierarchies", available online at http://www.cs.umd.edu.hcil/treemap-history/, Jun. 17, 2008, 12 pages.
Singh et al., "Enterprise Reporting with Oracle Reports: Reliable, Extensible, and Integrated", Oracle Reports Whitepaper, Aug. 2005, 16 pages.

\* cited by examiner

*FIG. 2*

USER INTERFACE CONTROLS FOR SPECIFYING DATA HIERARCHIES

CROSS REFERENCE TO RELATED APPLICATION

This application is a continuation of, and claims benefit and priority to application Ser. No. 15/187,615, filed Jun. 20, 2016, entitled "USER INTERFACE CONTROLS FOR SPECIFYING DATA HIERARCHIES (now allowed), which is a continuation of, and claims the benefit and priority to application Ser. No. 12/503,404, filed Jul. 15, 2009, entitled "USER INTERFACE CONTROLS FOR SPECIFYING DATA HIERARCHIES", now U.S. Pat. No. 9,396,241, the entire contents of which are hereby incorporated by reference as if fully set forth herein, under 35 U.S.C. § 120.

BACKGROUND

The present disclosure relates in general to user interface design, and in particular to user interface controls that facilitate the specification of data hierarchies.

Many data sets that are represented in a "flat" (i.e., non-hierarchical) format can be reorganized in a hierarchical manner. For example, consider a table of employee salary data, where each row in the table includes values for attributes "employee name," "employee salary," "manager name," "department," and "organization." In this table, various rows having distinct values for "employee name" can share a common value for "manager name." Further, various rows having distinct values for "employee name" can share a common value for "department." Yet further, various rows having distinct values for "department" can share a common value for "organization." Thus, although the table is a flat list of records, the salary data in the table can be reorganized (e.g., summarized) hierarchically with respect to an ordered sequence of attributes (e.g., organization>department>manager name). This ordered sequence of attributes is referred to herein as a "data hierarchy."

There are a number of software applications that allow users to specify a data hierarchy for a data set for the purpose of visualizing the data set according to the hierarchy. For example, Microsoft Excel (developed by Microsoft Corporation) provides tools known as pivot tables and pivot charts. Using these tools, a user can specify a data hierarchy for a spreadsheet table by dragging and dropping column headers of the table to various locations. The data in the table is then displayed (e.g., via another table or via a chart) according to the specified data hierarchy.

Although the drag-and-drop functionality described above can be a convenient mechanism for specifying a data hierarchy, it is also associated with several well-known usability issues. For example, there are difficulties informing users that the drag-and-drop functionality exists, difficulties informing users of what can be dragged and where the draggable objects can be dropped, difficulties informing users of drop-related errors, and difficulties providing accessible alternatives to drag-and-drop for users that cannot use a mouse (or other types of pointing devices required to perform drag-and-drop operations). Further, implementing drag-and-drop functionality in an application can be difficult from a development perspective since it typically requires more complex coding than other types of user interface interactions.

BRIEF SUMMARY

Embodiments of the present invention provide user interface (UI) controls that facilitate the specification of data hierarchies. In one set of embodiments, a first UI control component can be provided that comprises an ordered group of drop-down menus. Each drop-down menu in the ordered group can be populated with a selectable list of attributes from a data set and can be associated with a level in a data hierarchy. By selecting values (e.g., data set attributes) using the various drop-down menus, a user can interactively specify a data hierarchy for the data set. The data set can then be visualized according to the specified data hierarchy. In further embodiments, a second UI control component, such as a slider bar, can be provided in addition to the first UI control component. The second UI control component can allow a user to interactively enable or disable certain drop-down menus in the ordered group, thereby acting as a "depth filter" for controlling the depth of the data hierarchy.

Certain embodiments of the present invention can provide a number of benefits over existing user interface mechanisms for specifying data hierarchies (such as the drag-and-drop functionality in Microsoft Excel). For example, drop-down menus are generally familiar to users and clearly indicate what selection options are available. As a result, users can easily understand which attributes of a data set can be selected for a given level of a data hierarchy. Further, by only loading the drop-down menus with valid selection options, certain embodiments of the present invention can prevent users from specifying invalid data hierarchies. Yet further, drop-down menu interactions can be invoked using a variety of different input devices, including keyboards. Accordingly, these types of interactions can be more accessible than drag-and-drop interactions (which require the use of a mouse or other pointing device).

In certain embodiments, the first UI control component (e.g., the ordered group of drop-down menus) can be combined with the second UI control component (e.g., the slider bar) into a single component, alternatively, the two control components can be positioned such that they are located adjacent to each other in a user interface. In these embodiments, users can conveniently modify both the level and depth aspects of a data hierarchy from a central location. In addition, the current settings for both of these aspects can be viewed by looking at a single part of the user interface.

According to one embodiment of the present invention, a method for facilitating user specification of a data hierarchy is provided. The method comprises receiving, at a computer system, a data set including a plurality of rows, each row including values for a plurality of attributes, and generating, by the computer system, a user interface. The user interface includes a first control component comprising an ordered group of drop-down menus, where each drop-down menu is populated with a selectable list of attributes from the plurality of attributes and is operable to select a particular attribute as a level in a data hierarchy.

In one embodiment, the method above further comprises receiving, from a user, a selection change for a first drop-down menu in the ordered group of drop-down menus, and updating, based on the selection change, the selectable list of attributes for a second drop-down menu following the first drop-down menu in the ordered group.

In one embodiment, the updating comprises determining, based on the selection change, an attribute in the selectable list of attributes for the second drop-down menu that results in an invalid data hierarchy for the data set, and deleting the attribute from the selectable list of attributes for the second drop-down menu.

In one embodiment, each drop-down menu in the ordered group of drop-down menus is configured to display its current selection.

In one embodiment, the user interface further includes a second control component operable to disable one or more drop-down menus in the ordered group of drop-down menus, thereby disabling one or more levels in the data hierarchy.

In one embodiment, the second control component is operable to disable a first drop-down menu in the ordered group of drop-down menus only if all drop-down menus following the first drop-down menu in the ordered group have been disabled.

In one embodiment, the ordered group of drop-down menus are arranged in a row, and the second control component is a slider bar that spans the length of the row.

In one embodiment, disabling a drop-down menu comprises preventing a user from operating the drop-down menu to change its selection.

In one embodiment, the second control component is located adjacent to the first control component in the user interface.

In one embodiment, the user interface further includes a visualization component comprising a visualization of the data set according to the data hierarchy. The visualization of the data set can be a treemap, a clustered bar graph, a stacked bar graph, a hierarchical table, and/or the like.

According to another embodiment of the present invention, a machine-readable storage medium having stored thereon program code executable by a computer system is provided. The program code includes code that causes the computer system to receive a data set including a plurality of rows, each row including values for a plurality of attributes, and code that causes the computer system to generate a user interface. The user interface includes a first user control component comprising an ordered group of drop-down menus, where each drop-down menu is populated with a selectable list of attributes from the plurality of attributes and is operable to select a particular attribute as a level in a data hierarchy.

According to yet another embodiment of the present invention, a system for facilitating user specification of a data hierarchy is provided. The system comprises a storage component configured to store a data set including a plurality of rows, each row including values for a plurality of attributes, and a processing component in communication with the storage component. The processing component is configured to generate a user interface including a first user control component comprising an ordered group of drop-down menus, each drop-down menu being populated with a selectable list of attributes from the plurality of attributes and being operable to select a particular attribute as a level in a data hierarchy.

A further understanding of the nature and advantages of the embodiments disclosed herein can be realized by reference to the remaining portions of the specification and the attached drawings.

BRIEF DESCRIPTION OF THE DRAWINGS

FIG. 2 illustrates an example data set.

DETAILED DESCRIPTION

In the following description, for the purposes of explanation, numerous details are set forth in order to provide an understanding of embodiments of the present invention. It will be apparent, however, to one skilled in the art that certain embodiments can be practiced without some of these details.

Embodiments of the present invention provide user interface (UI) controls that facilitate the specification of data hierarchies. In one set of embodiments, a first UI control component can be provided that comprises an ordered group of drop-down menus. Each drop-down menu in the ordered group can be populated with a selectable list of attributes from a data set and can be associated with a level in a data hierarchy. By selecting values (e.g., data set attributes) for the various drop-down menus, a user can interactively specify a data hierarchy for the data set. The data set can then be visualized according to the specified data hierarchy. In further embodiments, a second UI control component, such as a slider bar, can be provided in addition to the first UI control component. The second UI control component can allow a user to interactively enable or disable certain drop-down menus in the ordered group, thereby acting as a "depth filter" for controlling the depth of the data hierarchy.

Certain embodiments of the present invention can provide a number of benefits over existing user interface mechanisms for specifying data hierarchies (such as the drag-and-drop functionality in Microsoft Excel). For example, drop-down menus are generally familiar to users and clearly indicate what selection options are available. As a result, users can easily understand which attributes of a data set can be selected for a given level of a data hierarchy. Further, by only loading the drop-down menus with valid selection options, certain embodiments of the present invention can prevent users from specifying invalid data hierarchies. Yet further, drop-down menu interactions can be invoked using a variety of different input devices, including keyboards. Accordingly, these types of interactions can be more accessible than drag-and-drop interactions (which require the use of a mouse or other pointing device).

In certain embodiments, the first UI control component (e.g., the ordered group of drop-down menus) can be combined with the second UI control component (e.g., the slider bar) into a single component, Alternatively, the two components can be positioned such that they are located adjacent to each other in a user interface. In these embodiments, users can conveniently modify both the level and depth aspects of a data hierarchy from a central location. In addition, the current settings for both of these aspects can be viewed by looking at a single part of the user interface.

Figure 1:
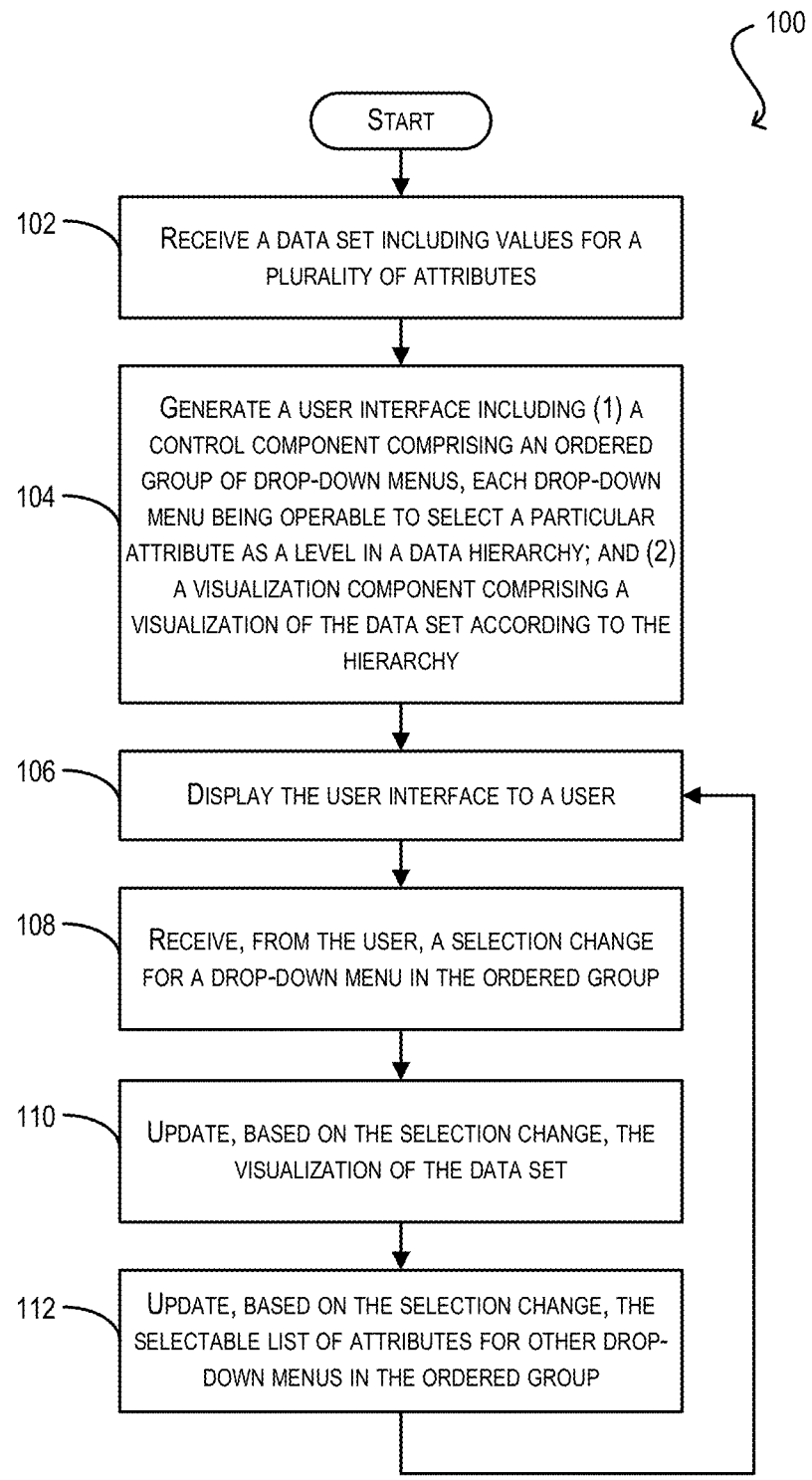
FIG. 1 is a flow diagram of a process for facilitating user specification of a data hierarchy according to an embodiment of the present invention.

FIG. 1 is a flow diagram of a process 100 for facilitating user specification of a data hierarchy according to an embodiment of the present invention. In various embodiments, process 100 can be implemented in hardware, software, or a combination thereof. As software, process 100 can be encoded as program code stored on a machine-readable storage medium.

At block 102, a data set can be received at a computer system, where the data set includes values for a plurality of attributes. In one set of embodiments, the data set can be received from a database and can correspond to data stored in one or more relational database tables. In alternative embodiments, the data can be received from other types of data sources. An example data set is described with respect to FIG. 2 below.

At block 104, a user interface can be generated by the computer system for visualizing the data set according to a user-specified data hierarchy. In one set of embodiments, the user interface can include a UI control component comprising an ordered group of drop-down menus. As used herein, a drop-down menu (also known as a "poplist," "picklist," or "drop-down list") is a user interface element comprising a list of selectable options, a field for displaying the currently selected option, and a control (e.g., button) for displaying the list below the field. In the context of HTML-based user interfaces, a drop-down menu can be defined using the "<select>" and "<option>" HTML tags.

In various embodiments, each drop-down menu in the ordered group can be populated with a selectable list of attributes from the data set received at block 102. For example, if the data set includes the attributes "employee name," "employee salary," "manager name," "department," and "organization," the list of selectable options for each drop-down menu can be populated with one or more of these particular attributes. Further, each drop-down menu can be associated with a level in a data hierarchy. For instance, if the ordered group includes three drop-down menus, the first drop-down menu can be associated with a first level in a data hierarchy, the second drop-down menu can be associated with a second level in the data hierarchy, and the third drop-down menu can be associated with a third level in the data hierarchy. Thus, by selecting values using the drop-down menus, a user can specify a sequence of attributes corresponding to a data hierarchy for the data set.

In certain embodiments, the user interface generated at block 104 can also include a visualization component. The visualization component can display a visualization of the data set received at block 102 in accordance with the data hierarchy specified via the UI control component (i.e., the ordered group of drop-down menus). The visualization can be any type of hierarchical visualization as known in the art, such as a treemap visualization, a clustered back graph visualization, a stacked bar graph visualization, a hierarchical table visualization, a multiple pie chart visualization, and or the like.

Once the user interface has been generated, it can be displayed to a user (block 106). In one set of embodiments, the user interface can be displayed with a default data hierarchy. In other words, the drop-down menus in the ordered group can be initialized with default attribute selections. In these embodiments, the visualization component can display a visualization of the data set according to the default data hierarchy. In other embodiments, the user interface can be displayed without a default data hierarchy (e.g., the drop-down menus in the ordered group can be defaulted to blank values). In these embodiments, the visualization component may not display a visualization until a valid data hierarchy is specified via the drop-down menus by the user.

Once the user interface has been displayed, the user can operate a particular drop-down menu in the UI control component and change the menu's selected value. For example, the user may wish to modify, or pivot, the data hierarchy such that a particular attribute of the data set is at the highest level of the hierarchy. In this case, the user can operate the first drop-down menu in the ordered group and change its selected value to the desired attribute. In response, information about this selection change can be received by the computer system (block 108) and the visualization of the data set (displayed via the visualization component) can be automatically updated to reflect the new data hierarchy (block 110). In this manner, the user can interactively modify the data hierarchy for the data set via the drop-down menus and see the results of those modifications in real-time or near real-time in the user interface.

In certain embodiments, when a selected value for a particular drop-down menu is changed, the selectable options for one or more other drop-down menus that follow that particular drop-down menu in the ordered group can be automatically updated to prevent the user from specifying an invalid data hierarchy (block 112). For instance, returning to the example above, assume the user has changed the selected value for the first drop-down menu in the ordered group (i.e., the drop-down menu corresponding to the highest level in the data hierarchy). In this case, the selectable options for other drop-down menus that follow the first drop-down menu in the ordered group can be automatically restricted to include only attribute values that will result in valid data hierarchies.

Once the user interface is updated per blocks 110 and 112, process 100 can return to block 106 where the user interface can be re-displayed to the user. Blocks 108-112 can then be repeated, thereby allowing the user to make any number of additional modifications to the data hierarchy.

It should be appreciated that process 100 is illustrative and that variations and modifications are possible. For example, in certain embodiments the user interface generated at block 104 can only comprise the UI control component (rather than both the UI control component and the visualization component). In these embodiments, the user interface would not display a visualization of the user-specified data hierarchy, and thus block 110 would not apply. Further, steps described as sequential can be executed in parallel, order of steps may be varied, and steps can be modified, combined, added, or omitted. One of ordinary skill in the art would recognize many variations, modifications, and alternatives.

Figure 2:
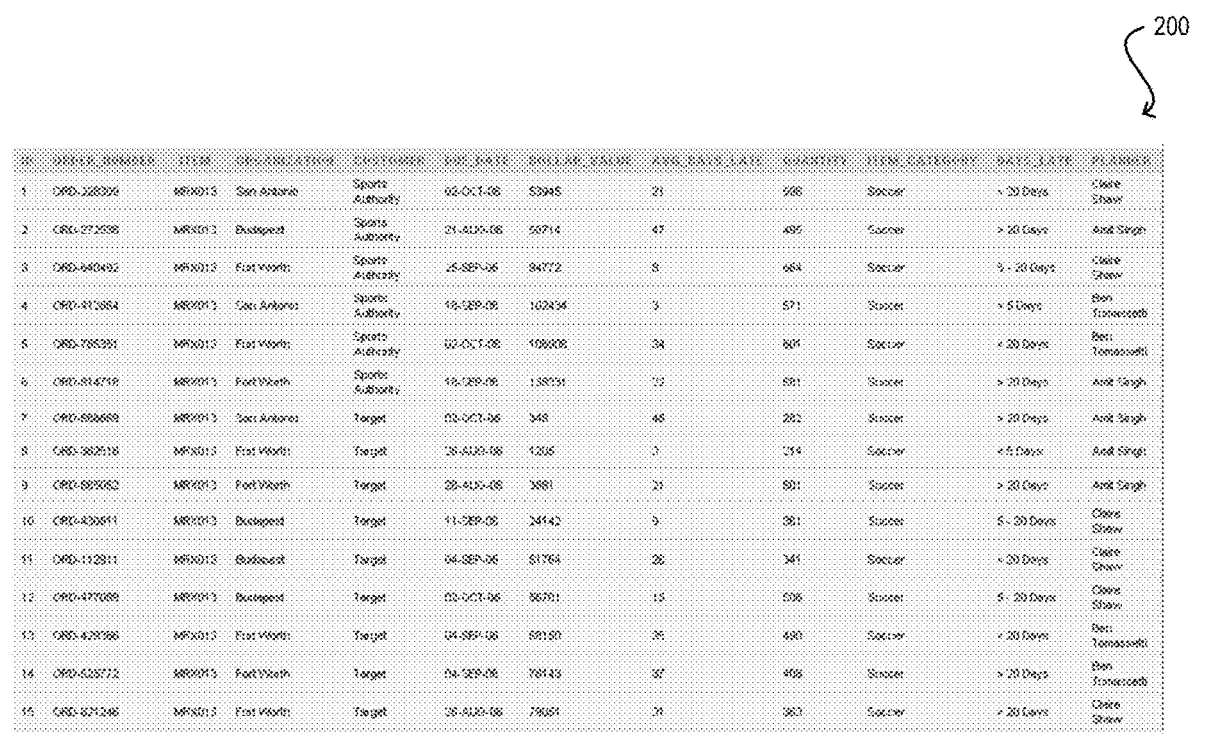

FIG. 2 illustrates an example data set 200 that can be received at block 102 of process 100. As shown, data set 200 is a table comprising a plurality of rows and a plurality of columns. Each column corresponds to an attribute (e.g., "item," "item category," "organization," etc.) that can be selected as a level in a data hierarchy for the data set.

Figure 3:
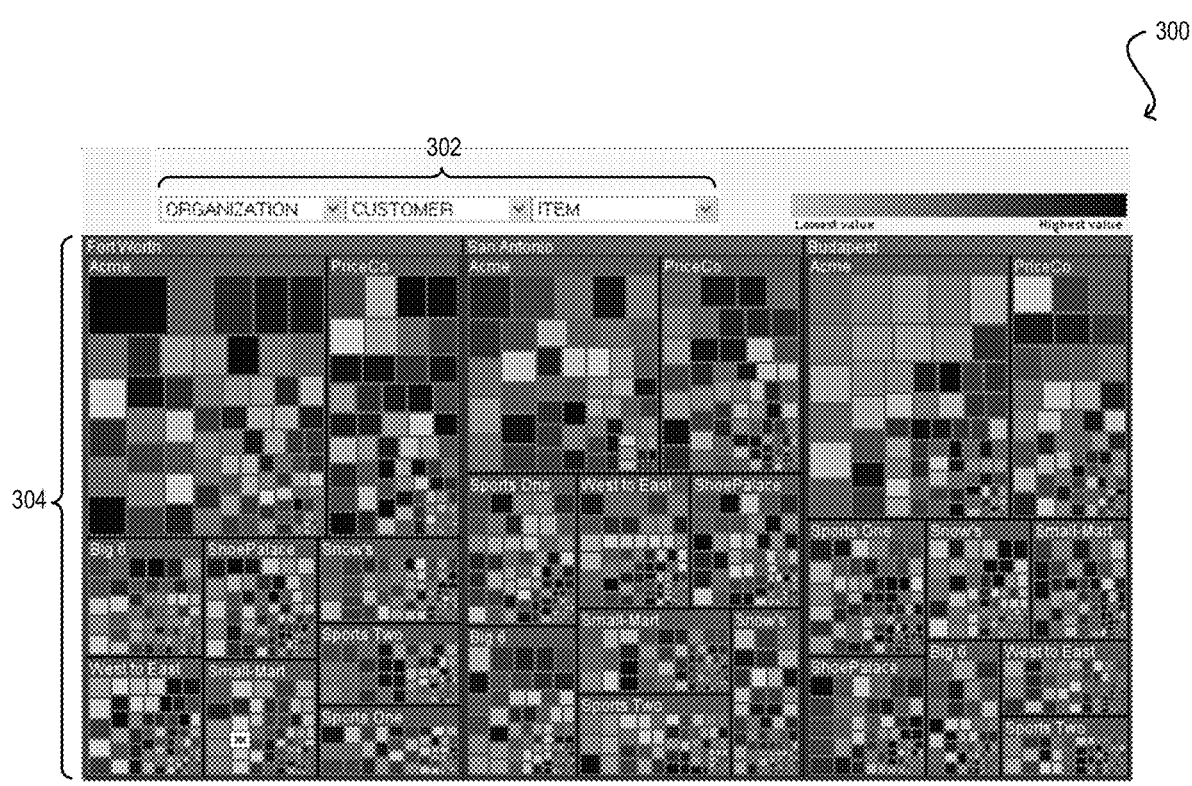
FIG. 3 illustrates a user interface for specifying a data hierarchy according to an embodiment of the present invention.
Figure 4A:
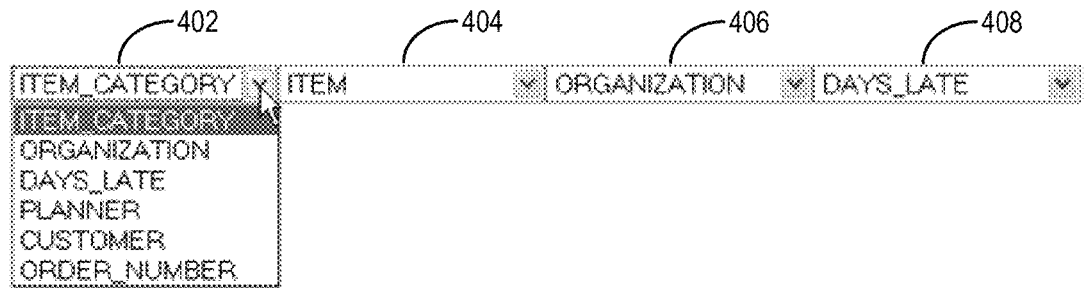
FIGS. 4A-4D and 5A-5B illustrate an ordered group of drop-down menus for specifying a data hierarchy according to an embodiment of the present invention.
Figure 4B:
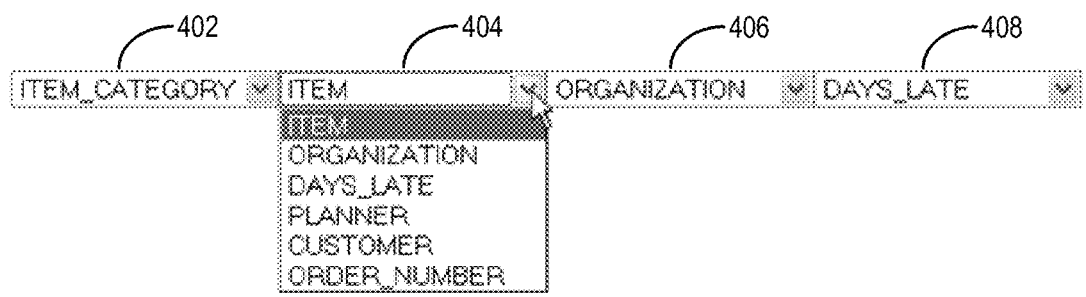
Figure 4C:
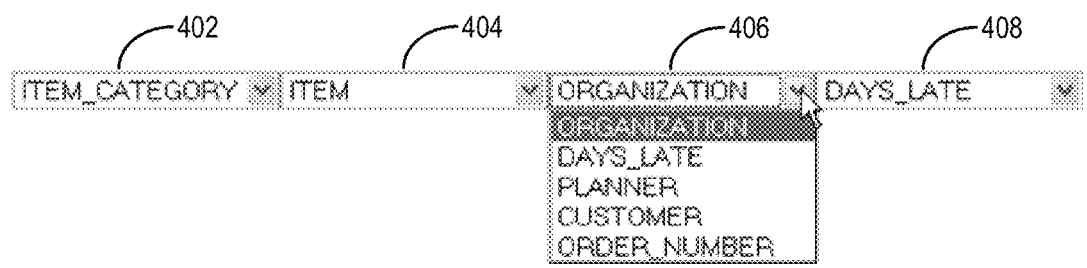
Figure 4D:
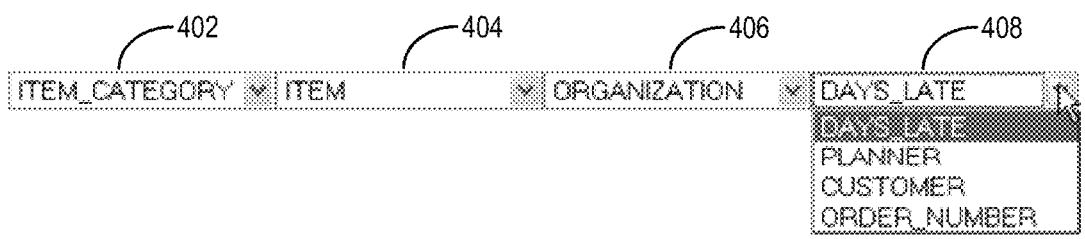

FIG. 3 illustrates an example user interface 300 that can be generated per process 100 of FIG. 1 for specifying a data hierarchy. In this example, user interface 300 is based on data set 200 of FIG. 2. As shown, user interface 300 includes a UI control component 302 comprising an ordered group of three drop-down menus. This group of menus can be operated by a user to specify a data hierarchy. In the illustrated embodiment, the drop-down menus are ordered left to right, such that the left-most drop-down menu corresponds to a first level in the data hierarchy, the middle drop-down menu corresponds to a second level in the data hierarchy, and the right-most drop-down menu corresponds to a third level in the data hierarchy. In alternative embodiments, the drop-down menus can be arranged and/or ordered in other configurations, such stacked in a column and ordered top to bottom or bottom to top. In addition, although only three drop-down menus are depicted, any number of menus can be supported.

User interface 300 also includes a visualization component 304 comprising a visualization of data set 200. In various embodiments, this visualization can be generated based on the data hierarchy specified via UI control component 302. For example, in the illustrated embodiment, the visualization is generated based on the data hierarchy "organization>customer>item," which is the currently selected hierarchy in UI control component 302. As shown, the visualization is a treemap visualization. However, in alternative embodiments the visualization can also be any type of hierarchical visualization as known in the art.

Each drop-down menu in UI control component 302 can be populated with a selectable list of attributes from data set 200. In one set of embodiments, the selectable lists for the various drop-down menus can be identical. In other embodiments, the selectable lists can differ and can be automatically defined in a manner that prevents a user from specifying an invalid data hierarchy for the data set. Examples of invalid data hierarchies include hierarchies that include the same attribute at multiple levels, and/or hierarchies that define a first attribute as a child of a second attribute even though the first attribute cannot be properly considered a sub-categorization of the second attribute.

By way of example, FIGS. 4A-4D illustrate selectable attribute lists for an ordered group of four drop-down menus 402-408 based on data set 200. As described, above, the selectable lists for each drop-down menu can be defined such that a user cannot specify an invalid data hierarchy. For example, since "item category" is selected via menu 402 for the first level in the data hierarchy, none of the remaining drop-down menus allow selection of "item category" for a lower level in the hierarchy.

Figure 5A:
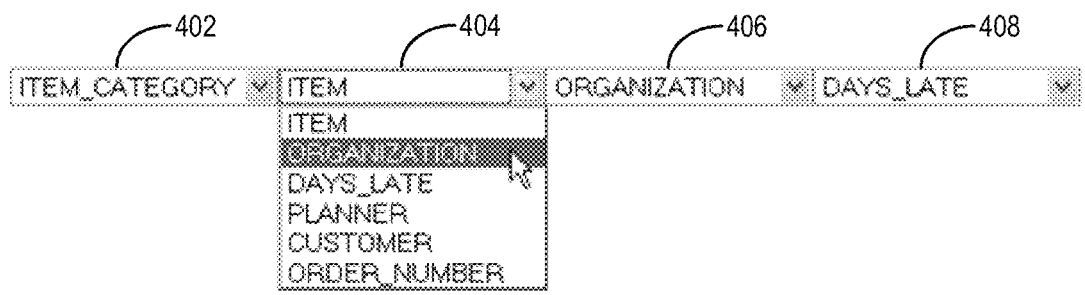
Figure 5B:
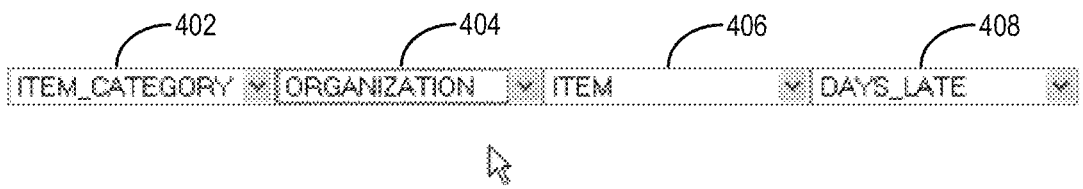

In one set of embodiments, the selectable lists for drop-down menus 402-408 can be automatically updated in response to a change in selection for a particular menu. This ensures that the menus remain "in sync" and thereby prevent user specification of an invalid data hierarchy. For example, FIGS. 5A and 5B illustrate a situation where a user changes the selected value for menu 404 from "item" to "organization." In response to this change, the attribute "organization" is removed from the selectable list for menu 406 (note that the selected value for menu 406 has changed to "item" in FIG. 5B from "organization" in FIG. 5A). Although not shown, the "organization" attribute can also be removed from the selectable list for menu 408. In a particular embodiment, only the drop-down menus following the changed menu in the ordered group are automatically updated in the manner described above.

Figure 6:
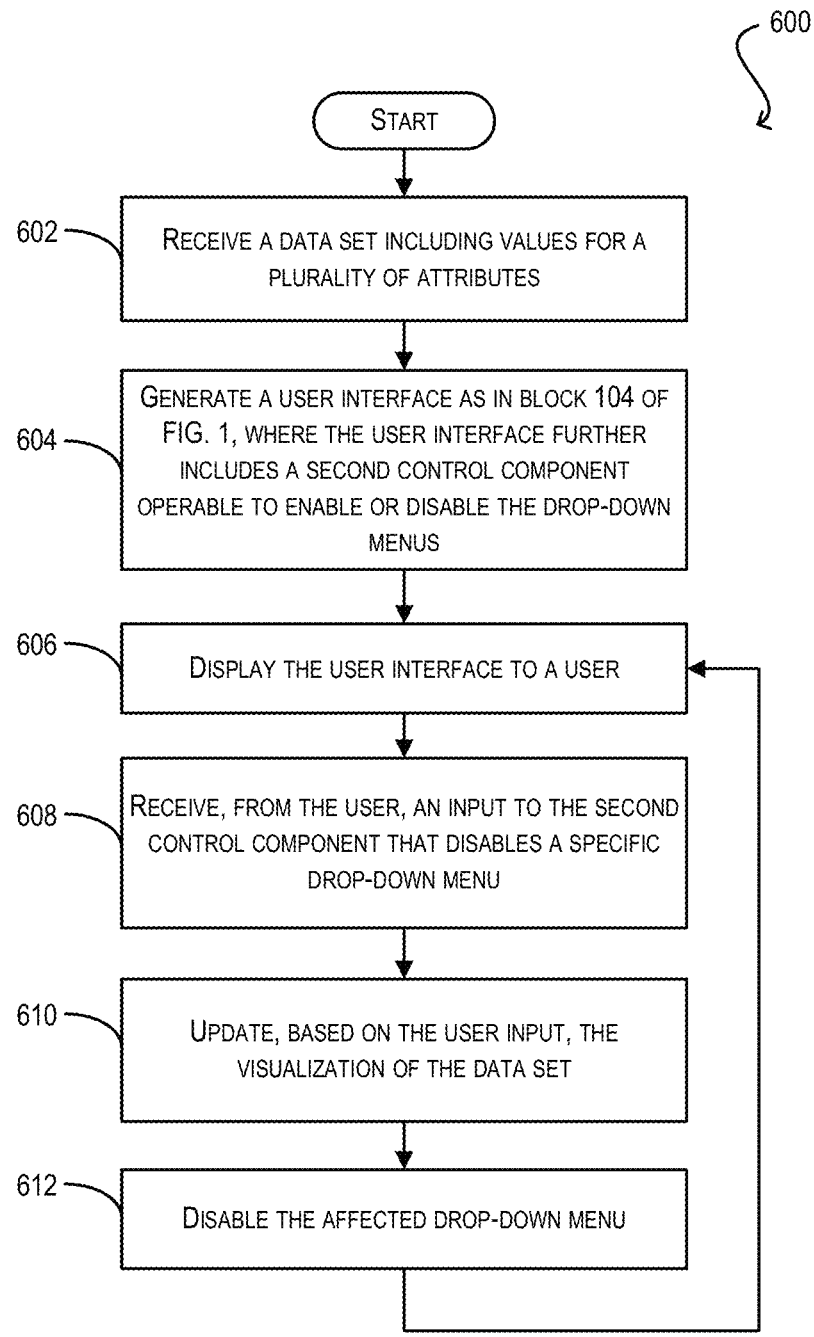
FIG. 6 is a flow diagram of another process for facilitating user specification of a data hierarchy according to an embodiment of the present invention.

FIG. 6 is a flow diagram of another process (600) for facilitating user specification of a data hierarchy according to an embodiment of the present invention. In various embodiments, process 600 can be implemented in hardware, software, or a combination thereof. As software, process 600 can be encoded as program code stored on a machine-readable storage medium.

At block 602, a data set can be received at a computer system, where the data set includes values for a plurality of attributes. At block 604, a user interface can be generated as in block 104 of process 100. For example, the user interface can include (1) a first UI control component (e.g., an ordered group of drop-down menus) for specifying a data hierarchy for a data set and (2) a visualization component for visualizing the data set according to the data hierarchy.

In the embodiment of FIG. 6, the user interface can also include a second UI control component, such as a slider bar. This second UI control component can be operable to enable or disable one or more drop-down menus in the first UI control component, thereby functioning as a "depth filter" for enabling or disabling one or more levels in the data hierarchy. In certain embodiments, the second UI control component can be located adjacent to the first UI control component in the user interface. This allows users to conveniently modify both the level and depth aspects of a data hierarchy from a central location. In addition, the current settings for both of these aspects can be viewed by looking at a single part of the user interface.

Once the user interface has been generated, it can be displayed to a user (block 606). At block 608, an input to the second UI control component can be received, where the input is intended to disable a particular drop-down menu in the first UI control component (thereby disabling a corresponding level in the data hierarchy). In response, the visualization displayed in the user interface can be automatically updated to reflect the new data hierarchy (block 610) and the affected drop-down menu can be disabled (block 612).

For example, if first UI control component includes three drop-down menus (corresponding to a three level hierarchy) and if the second UI control component is used to disable the third drop-down menu, the visualization can be updated to display only the first two levels of the hierarchy. In addition, the third drop-down menu can be disabled such that the menu can no longer by operated by the user.

In a particular embodiment, the second UI control component can only be used to disable a particular drop-down menu in the ordered group if all other drop-down menus following that particular menu in the group have been disabled. In other words, the second UI control component can only be used to reduce the depth of data hierarchy in a "bottom up" fashion. In alternative embodiments, the second UI control component may operate differently, For example, in one alternative embodiment the second UI control component may allow the filtering of hierarchy levels in a "top down" rather than "bottom up" manner.

Once the user interface has been updated per blocks 610 and 612, process 600 can return to block 606 where the user interface can be re-displayed to the user. Blocks 608-612 can then be repeated, thereby allowing the user to make additional modifications to the depth of the data hierarchy.

It should be appreciated that process 600 is illustrative and that variations and modifications are possible. Steps described as sequential can be executed in parallel, order of steps may be varied, and steps can be modified, combined, added, or omitted. One of ordinary skill in the art would recognize many variations, modifications, and alternatives.

Figure 7A:
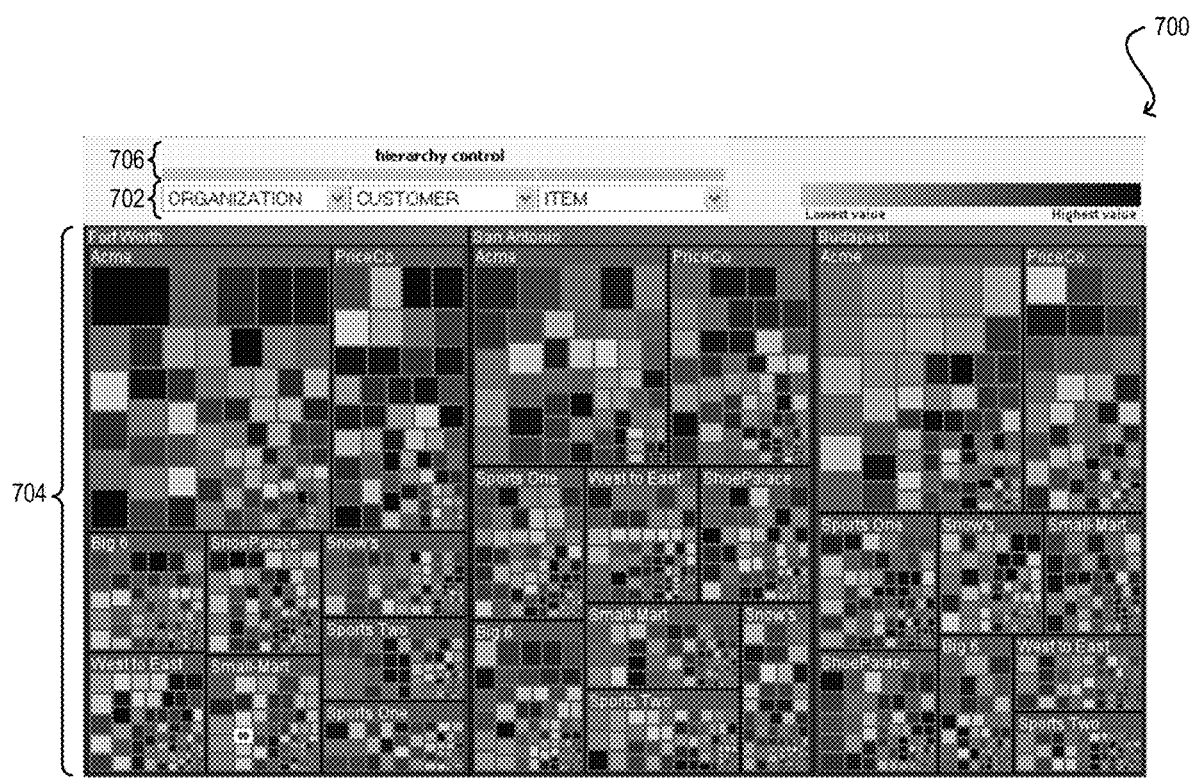
FIGS. 7A-7C illustrate another user interface for specifying a data hierarchy according to an embodiment of the present invention.

FIG. 7A illustrates an example user interface 700 that can be generated per process 600 of FIG. 6. Like user interface 300 of FIG. 3, user interface 700 includes a UI control component 702 comprising an ordered group of drop-down menus for specifying a data hierarchy, and a visualization component 704 for visualization a data set according to the data hierarchy. User interface 700 also includes a slider bar 706 corresponding to the second UI control component described with respect to process 600. In particular, slider bar 706 is operable to disable (from right to left) the drop-down menus in component 702, thereby disabling those levels in the data hierarchy. In the embodiment shown, slider bar 706 is located adjacent to component 702 in the user interface. This allows users to conveniently modify both the level and depth aspects of a data hierarchy from a central location. In addition, the current settings for both of these aspects can be viewed by looking at a single part of the user interface.

Figure 7B:

FIG. 7B depicts user interface 700 after the third drop-down menu in control component 702 has been disabled via slider bar 706. As shown, the third drop-down menu is grayed-out, indicating that its selected value can no longer be changed by the user. In addition, visualization component 704 has been updated to display only the first two levels of the data hierarchy (e.g., "organization" and "customer"). Note that, in this embodiment, the values that were previously displayed at the "item" level in FIG. 7A have now been aggregated at the "customer" level of the hierarchy.

Figure 7C:
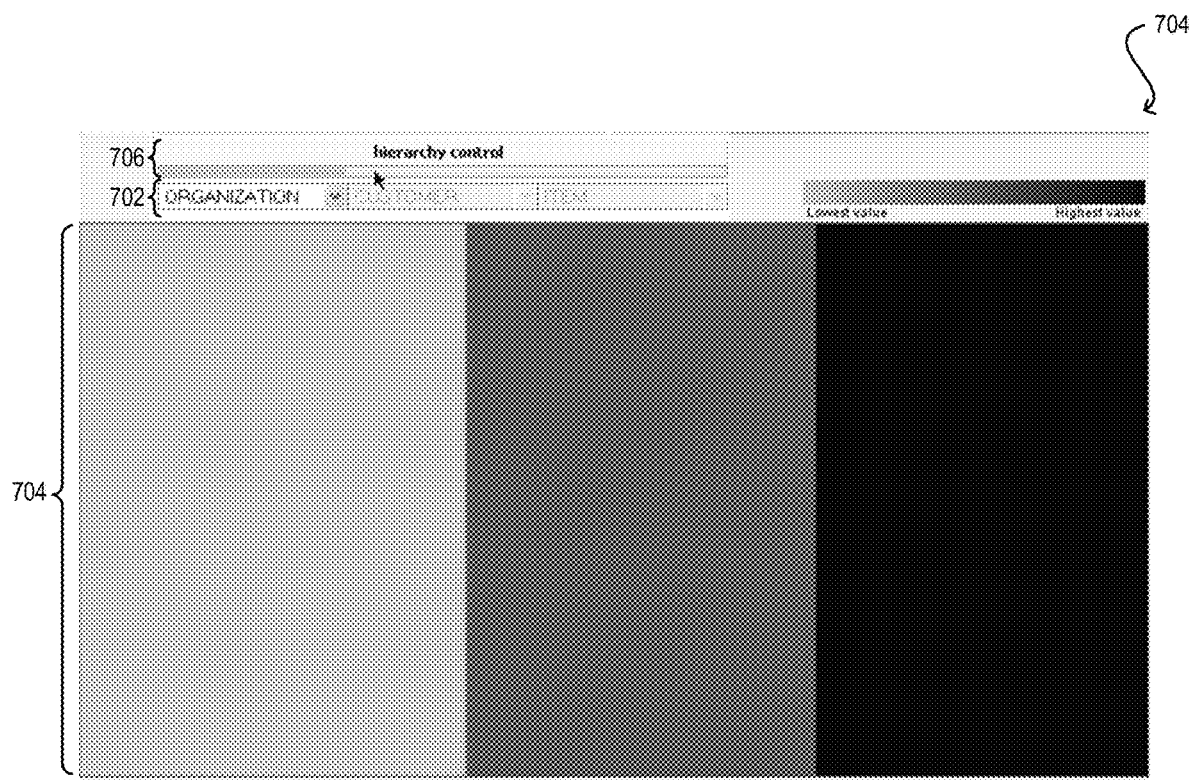

FIG. 7C depicts user interface 700 after both the third and second drop-down menus in control component 702 have been disabled via slider bar 706. As shown, both the second and third drop-down menus have been grayed-out, indicating that their selected values can no longer be changed by the user. In addition, visualization component 704 has been updated again to display only the first level in the data hierarchy (e.g., "organization"). Note that, in this embodiment, the values that were previously displayed at the "customer" level in FIG. 7B have now been aggregated at the "organization" level of the hierarchy. Although not shown, in certain embodiments slider bar 706 can be operated to re-enable the second and/or third drop-down menus of component 702, thereby re-enabling those levels of the data hierarchy.

Figure 8:
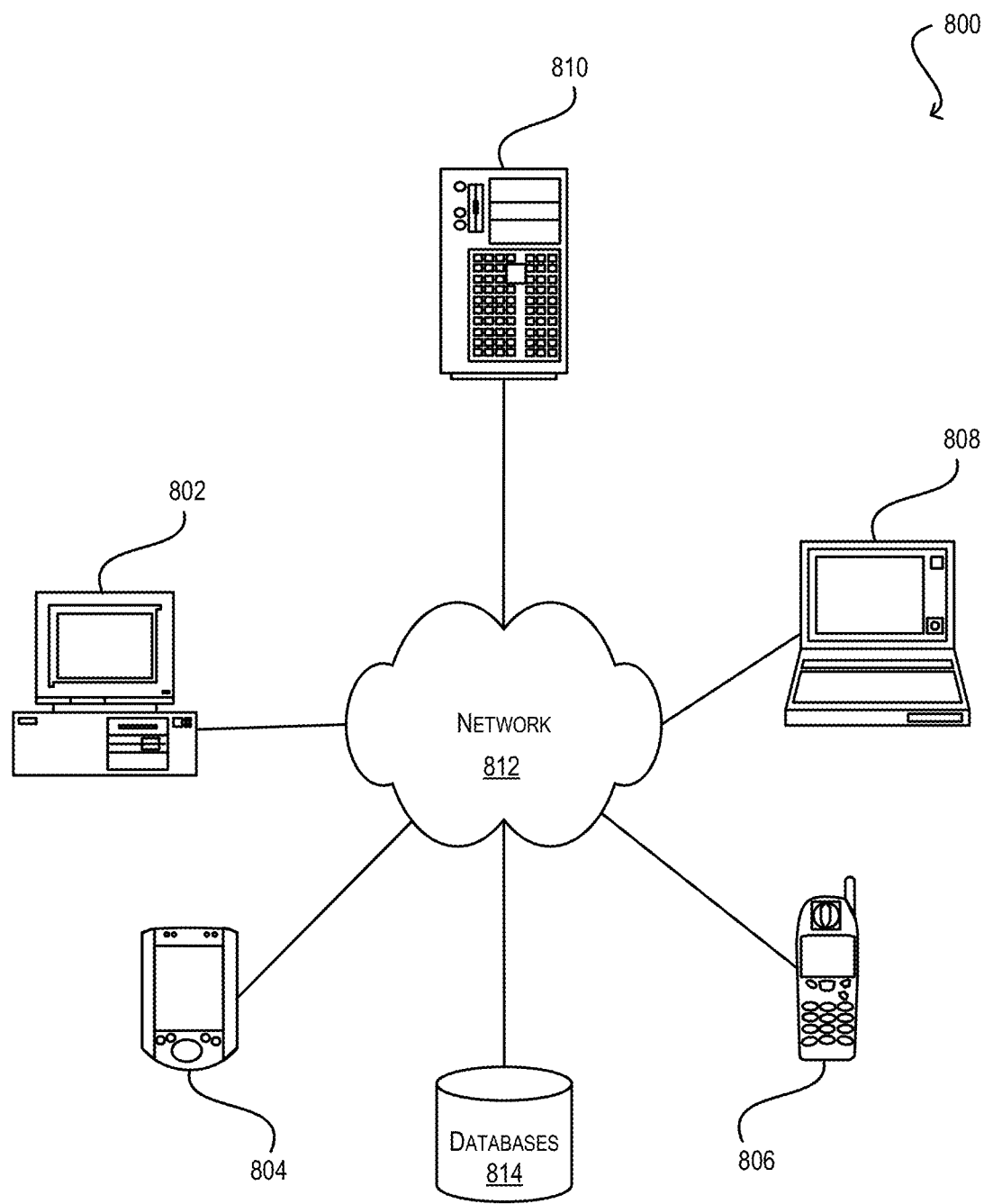
FIG. 8 is a simplified block diagram of a system environment that can be used in accordance with an embodiment of the present invention.

FIG. 8 is a simplified block diagram illustrating a system environment 800 that can be used in accordance with an embodiment of the present invention. As shown, system environment 800 can include client computing devices 802, 804, 806, 808 communicatively coupled with a server computer 810 via a network 812. In one set of embodiments, client computing devices 802, 804, 806, 808 can be configured to run a client application (e.g., a Web browser) and present, via the client application, the user interfaces described herein to a user. Server computer 810 can be configured to run a server application for generating the user interfaces. Although system environment 800 is shown with four client computing devices and one server computer, any number of client computing devices and server computers can be supported.

Client computing devices 802, 804, 806, 808 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, and/or other communication protocol enabled), and/or workstation computers running any of a variety of commercially-available UNIX or UNIX-like operating systems (including without limitation the variety of GNU/Linux operating systems). Alternatively, client computing devices 802, 804, 806, 808 can be any other electronic device capable of communicating over network 812 with server computer 810.

Server computer 810 can be a general purpose computer, specialized server computer (including, e.g., a LINUX server, UNIX server, mid-range server, mainframe computer, rack-mounted server, etc.), server farm, server cluster, or any other appropriate arrangement and/or combination. Server computer 810 can run an operating system including any of those discussed above, as well as any commercially available server operating system. Server computer 810 can also run any of a variety of server applications and/or mid-tier applications, including Web servers, Java virtual machines (JVMs), application servers, database servers, and the like. As indicated above, in one set of embodiments, server computer 810 is adapted to generate the user interfaces described herein and process user inputs to those interfaces.

As shown, client computing devices 802, 804, 806, 808 and server computer 810 are communicatively coupled via network 812. Network 812 can be any type of network that supports data communications using any of a variety of protocols, including without limitation TCP/IP, SNA, IPX, AppleTalk, and the like. Merely by way of example, network 812 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infrared network; a wireless network (e.g., a network operating under any of the IEEE 802.11 suite of protocols, the Bluetooth protocol known in the art, and/or any other wireless protocol); and/or any combination of these and/or other networks.

System environment 800 can also include a database 814. In one set of embodiments, database 814 can be configured to store any of the data described in the foregoing disclosure, such as the data sets received in FIGS. 1 and 6. Database 814 can reside in a variety of locations. For example, database 814 can reside on a storage medium local to (and/or resident in) one or more of the computers 802, 804, 806, 808, 810. Alternatively, database 814 can be remote from any or all of the computers 802, 804, 806, 808, 810 and/or in communication (e.g., via network 812) with one or more of these. In one set of embodiments, database 814 can reside in a storage-area network (SAN) familiar to those skilled in the art. Similarly, any necessary files for performing the functions attributed to computers 802, 804, 806, 808, 810 can be stored locally on the respective computer and/or remotely on database 814, as appropriate. In one set of embodiments, database 814 can be a relational database, such as Oracle 10g available from Oracle Corporation. In certain embodiments, database 814 can be adapted to store, update, and retrieve data in response to SQL-formatted commands.

Figure 9:
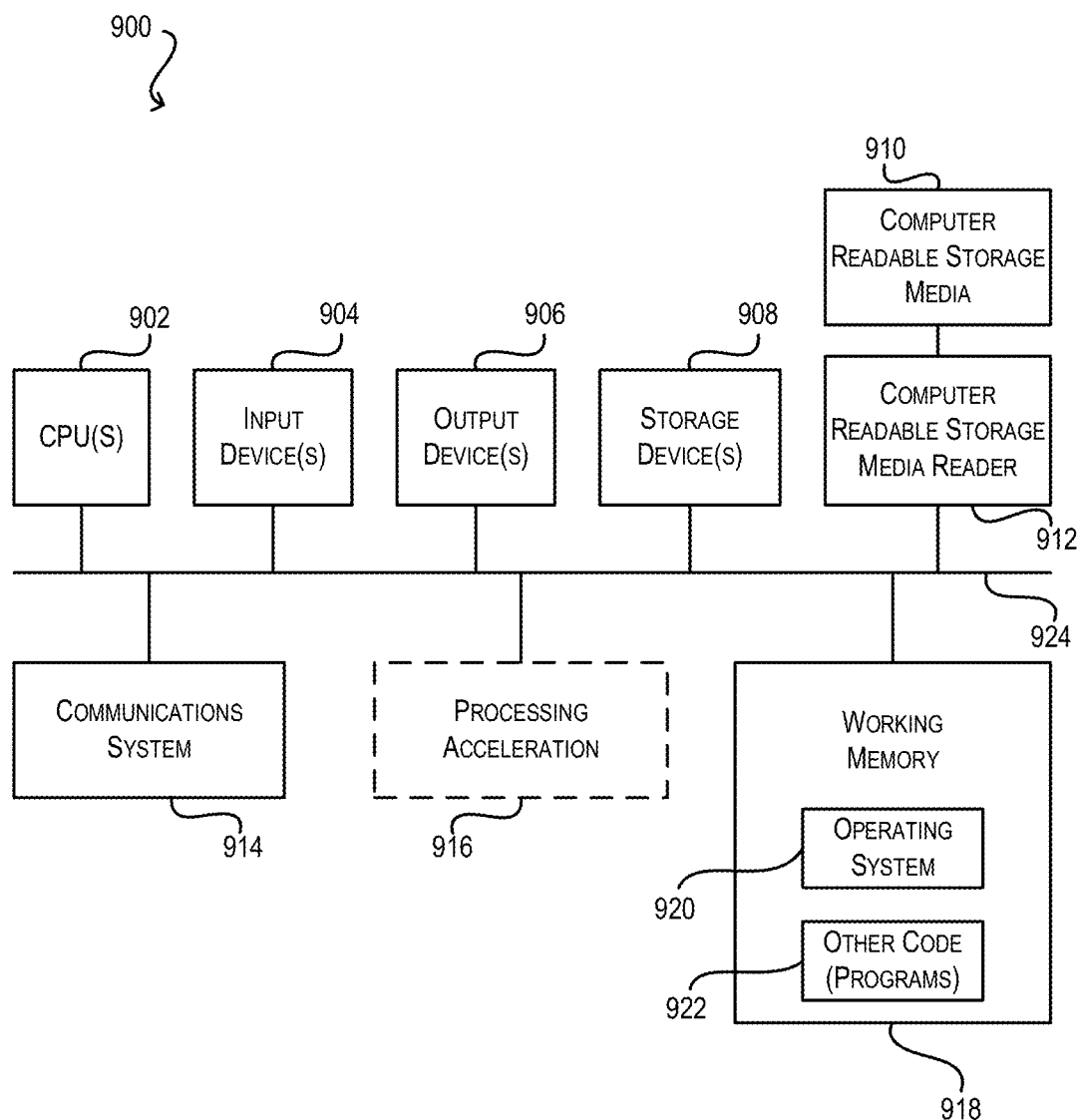
FIG. 9 is a simplified block diagram of a computer system that can be used in accordance with an embodiment of the present invention.

FIG. 9 is a simplified block diagram illustrating a computer system 900 that can be used in accordance with an embodiment of the present invention. In various embodiments, computer system 900 can implement any of the computers 802, 804, 806, 808, 810 illustrated in system environment 800. As shown in FIG. 9, computer system 900 comprises hardware elements that can be electrically coupled via a bus 924. The hardware elements can include one or more central processing units (CPUs) 902, one or more input devices 904 (e.g., a mouse, keyboard, etc.), and one or more output devices 906 (e.g., a display device, printer, etc.). Computer system 900 can also include one or more storage devices 908. For example, storage device(s) 908 can include devices such as disk drives, optical storage devices, and solid-state storage devices such as a random access memory (RAM) and/or a read-only memory (ROM), which can be programmable, flash-updateable and/or the like.

Computer system 900 can additionally include a computer-readable storage media reader 912, a communications subsystem 914 (e.g., a modem, network card (wireless or wired), infra-red communication device, etc.), and working memory 918, which can include RAM and ROM devices as described above. In some embodiments, computer system 900 can also include a processing acceleration unit 916, which can include a digital signal processor (DSP), a special-purpose processor, and/or the like.

Computer-readable storage media reader 912 can further be connected to a computer-readable storage medium 910, together (and, optionally, in combination with storage device(s) 908) comprehensively representing remote, local, fixed, and/or removable storage devices plus storage media for temporarily and/or more permanently containing computer-readable information. Communications system 914 can permit data to be exchanged with network 812 of FIG. 8 and/or any other computer described above with respect to system environment 800.

Computer system 900 can also comprise software elements, shown as being currently located within working memory 918, including an operating system 920 and/or other code 922, such as an application program (which may be a client application, Web browser, Web server, RDBMS, etc.). It should be appreciated that alternative embodiments of computer system 900 may have numerous variations from that described above. For example, customized hardware might also be used and/or particular elements might be implemented in hardware, software (including portable software, such as applets), or both. Further, connection to other computing devices such as network input/output devices can be employed.

In one set of embodiments, the techniques described herein can be implemented as program code executable by a computer system (such as a computer system 900) and can be stored on machine (e.g., computer) readable storage media. Machine-readable storage media can include any appropriate media known or used in the art, including volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Although specific embodiments of the present invention have been described herein, various modifications, alterations, alternative constructions, and equivalents are within the scope of the invention. For example, embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention can be implemented only in hardware, or only in software, or using combinations thereof.

The specification and drawings are, accordingly, to be regarded in an illustrative rather than a restrictive sense. The scope of the invention should be determined not with reference to the above description, but instead should be determined with reference to the pending claims along with their full scope or equivalents.

What is claimed is:

1. A method, comprising:
generating a user interface comprising a slide bar control interface that spans a length of a row associated with a group of drop-down menus and is adjacent to the row of the group of drop-down menus, the slide bar control configured to control a depth of the group of drop-down menus, each drop-down menu being operable to select a particular attribute as a level in a data hierarchy of the data set, and the depth indicating a number of drop-down menus to be enabled at a particular time;
disabling one or more drop-down menus in the group of drop-down menus to generate a subset of the group of drop-down menus;
receiving a selection of at least one menu of the subset of the group of drop-down menus; and
providing a visualization of a data set based at least in part on the received selection.

2. The method of claim 1, further comprising:
receiving, from a user, a selection change for a first drop-down menu in the group of drop-down menus; and
updating, based at least in part on the selection change, a selectable list of attributes for a second drop-down menu following the first drop-down menu in the ordered group.

3. The method of claim 2, wherein the updating comprising:
determining, based at least in part on the selection change, an attribute in the selectable list of attributes for the second drop-down menu that results in an invalid data hierarchy for the data set; and
deleting the attribute from the selectable list of attributes for the second drop-down menu.

4. The method of claim 1, wherein each drop-down menu in the group of drop-down menus is configured to display a current selection of the drop-down menu.

5. The method of claim 1, wherein the slide bar control interface is operable to disable the one or more drop-down menus in the group of drop-down menus, thereby disabling one or more levels in a data hierarchy and affecting an amount of the data provided in the visualization.

6. The method of claim 5, wherein the slide bar control interface is operable to disable a particular drop-down menu in the group of drop-down menus only if all drop-down menus following the particular drop-down menu in the group have been disabled.

7. The method of claim 5, wherein the group of drop-down menus are arranged in a row.

8. The method of claim 5, wherein disabling a drop-down menu comprises preventing a user from operating the drop-down menu to change a selection.

9. The method of claim 1, wherein the visualization of the data set comprises at least one of a treemap or a clustered bar graph.

10. The method of claim 1, wherein each drop-down menu is further populated with a blank value.

11. A non-transitory machine-readable storage medium having stored thereon program code executable by a computer system, the program code comprising:

program code that causes the computer system to generate a user interface comprising a slide bar control interface that is adjacent to a group of drop-down menus, the slide bar control configured to control a depth of the group of drop-down menus, each drop-down menu being operable to select a particular attribute as a level in a data hierarchy of the data set, and the depth indicating a number of drop-down menus to be enabled at a particular time;

program code that causes the computer system to disable one or more drop-down menus in the group of drop-down menus to generate a subset of the group of drop-down menus;

program code that causes the computer system to receive a selection of at least one menu of the subset of the group of drop-down menus; and program code that causes the computer system to provide a visualization of the data set based at least in part on the received selection.

12. The machine-readable storage medium of claim 11, wherein the program code further comprises:

program code that causes the computer system to receive, from a user, a selection change for a first drop-down menu in the group of drop-down menus; and program code that causes the computer system to update, based at least in part on the selection change, the selectable list of attributes for a second drop-down menu following the first drop-down menu in the ordered group.

13. The machine-readable storage medium of claim 11, wherein the slide bar control interface is operable to disable the one or more drop-down menus in the group of drop-down menus, thereby disabling one or more levels in a data hierarchy.

14. The machine-readable storage medium of claim 13, wherein the group of drop-down menus are arranged in a row, and wherein the slide bar control interface spans the length of the row.

15. The machine-readable storage medium of claim 11, wherein the visualization comprises a hierarchical visualization of the data set according to a data hierarchy.

16. A system, comprising:

a non-transitory storage component configured to store a data set to be provided in a hierarchical visualization, the data set comprising values for a plurality of attributes of the data set; and a processing component in communication with the storage component, the processing component being configured to:

generate a user interface comprising a slide bar control interface that is adjacent to a group of drop-down menus, the slide bar control configured to control a depth of the group of drop-down menus, each drop-down menu being operable to select a particular attribute as a level in a data hierarchy of the data set, and the depth indicating a number of drop-down menus to be enabled at a particular time;

disable one or more drop-down menus in the group of drop-down menus to generate a subset of the group of drop-down menus;

receive a selection of at least one menu of the subset of the group of drop-down menus; and provide a visualization of a data set based at least in part on the received selection.

17. The system of claim 16, wherein the processing component is further configured to:

receive, from a user, a selection change for a first drop-down menu in the group of drop-down menus; and update, based at least in part on the selection change, a selectable list of attributes for a second drop-down menu following the first drop-down menu in the group of drop-down menus.

18. The system of claim 16, wherein the slide bar control is operable to disable one or more drop-down menus in the group of drop-down menus, thereby disabling one or more levels in a data hierarchy.

19. The system of claim 18, wherein the group of drop-down menus are arranged in a row, and wherein the second control component is a slider bar that spans the length of the row.

20. The system of claim 16, wherein the visualization comprises a hierarchical visualization of the data set according to a data hierarchy.

* * * * *